(12) United States Patent
Brisighella, Jr.

(10) Patent No.: US 7,712,568 B2
(45) Date of Patent: May 11, 2010

(54) METHOD AND APPARATUS FOR MOTOR VEHICLE LOCKOUT

(75) Inventor: Dario G. Brisighella, Jr., North Logan, UT (US)

(73) Assignee: Autoliv ASP, Inc., Ogden, UT (US)

( * ) Notice: Subject to any disclaimer, the term of this patent is extended or adjusted under 35 U.S.C. 154(b) by 216 days.

(21) Appl. No.: 12/099,977

(22) Filed: Apr. 9, 2008

(65) Prior Publication Data

US 2009/0255749 A1 Oct. 15, 2009

(51) Int. Cl.
*B60K 28/00* (2006.01)
(52) U.S. Cl. ..................................... 180/273
(58) Field of Classification Search ............... 180/271, 180/273, 279, 285; 701/36
See application file for complete search history.

(56) References Cited

U.S. PATENT DOCUMENTS

| | | | |
|---|---|---|---|
| 6,007,094 A | 12/1999 | Hosoda | |
| 6,772,061 B1 * | 8/2004 | Berthiaume et al. | 701/110 |
| 6,804,595 B1 | 10/2004 | Quail et al. | |
| 7,012,533 B2 * | 3/2006 | Younse | 340/573.1 |
| 7,137,471 B1 | 11/2006 | Benesh | |
| 7,287,617 B2 | 10/2007 | Mobley et al. | |
| 7,299,890 B2 | 11/2007 | Mobley et al. | |
| 7,315,779 B1 * | 1/2008 | Rioux et al. | 701/114 |
| 2005/0203752 A1 * | 9/2005 | Shinada | 705/1 |
| 2008/0252412 A1 * | 10/2008 | Larsson et al. | 340/5.2 |

\* cited by examiner

*Primary Examiner*—Faye M. Fleming
(74) *Attorney, Agent, or Firm*—Sally J Brown; Harness Dickey & Pierce

(57) ABSTRACT

A lockout system for a motor vehicle is provided. The system can include a source of input that identifies a status of a driver of the motor vehicle. The system can further include a source of passenger input that indicates if at least one passenger is present in the motor vehicle. The system can also include a lockout control module operable to disable the operation of the motor vehicle if at least one passenger is present in the motor vehicle, based on the status of the driver.

20 Claims, 4 Drawing Sheets

METHOD AND APPARATUS FOR MOTOR VEHICLE LOCKOUT

FIELD

The present disclosure relates generally to control systems for motor vehicles, and more specifically, to a method and apparatus for a motor vehicle lockout.

BACKGROUND

The statements in this section merely provide background information related to the present disclosure and may not constitute prior art.

Currently, the operation of a motor vehicle is restricted to individuals who have reached a certain age and who have passed certain examinations relating to the operation of the motor vehicle. In some instances, the operation of the motor vehicle may be further restricted based on the age of the individual or experience level of the individual. For example, in the case of a young driver or inexperienced driver, the young driver or inexperienced driver may be restricted to operating the motor vehicle during daylight hours, without passengers for some period of time specified by local and/or state regulations as a collision preventative measure.

Studies have also shown that young drivers or inexperienced drivers tend to be more distracted by passengers in the motor vehicle. Thus, it may be desirable to provide a motor vehicle lockout system that restricts the operation of the vehicle if passengers are present.

SUMMARY

A lockout system for a motor vehicle is provided. The system can include a source of input that identifies a status of a driver of the motor vehicle. The system can further include a source of passenger input that indicates if at least one passenger is present in the motor vehicle. The system can also include a lockout control module operable to disable the operation of the motor vehicle if at least one passenger is present in the motor vehicle, based on the status of the driver.

Further provided is a lockout system in combination with a motor vehicle having a frame that defines a passenger cabin. The passenger cabin can include a driver seat and at least one passenger seat. At least one wheel can be coupled to the frame, and the motor vehicle can further include a powertrain that can be operable to drive the at least one wheel to propel the motor vehicle. The lockout system can further include a key that can be operable to indicate a status of a driver. The lockout system can include an ignition switch disposed in the passenger cabin, which can be operable to receive the key and generate a signal that indicates the status of the driver and a request to enable the powertrain. The lockout system can also include at least one passenger sensor responsive to an input received from the at least one passenger seat. The at least one passenger sensor can generate a signal that indicates if at least one passenger is present in the motor vehicle. The lockout system can also include a lockout control module in communication with the ignition switch, the at least one passenger sensor, and the powertrain of the motor vehicle. The lockout control module can be operable to disable the powertrain if at least one passenger is present in the passenger cabin, based on the status of the driver.

Also provided is a method for selectively enabling a powertrain of a motor vehicle. The method can include determining a status of a driver in the motor vehicle. The method can also include determining if at least one passenger is present in the motor vehicle. The method can include preventing the operation of the motor vehicle if the status of the driver is restricted and at least one passenger is present in the motor vehicle.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present teachings, their application, or uses. As used herein, the term module, control module, component and/or device can refer to one or more of the following: an application specific integrated circuit (ASIC), an electronic circuit, a processor (shared, dedicated or group) and memory that executes one or more software or firmware programs, a combinational logic circuit and/or other suitable mechanical, electrical or electromechanical components that can provide the described functionality and/or combinations thereof. Although the following description is related generally to a motor vehicle lockout that can be used with an automobile, it will be understood that the motor vehicle lockout, as described and claimed herein, can be used with any suitable motorized vehicle, such as a snowmobile, scooter, boat, hovercraft, etc. Therefore, it will be understood that the following discussions are not intended to limit the scope of the appended claims.

Figure 1:
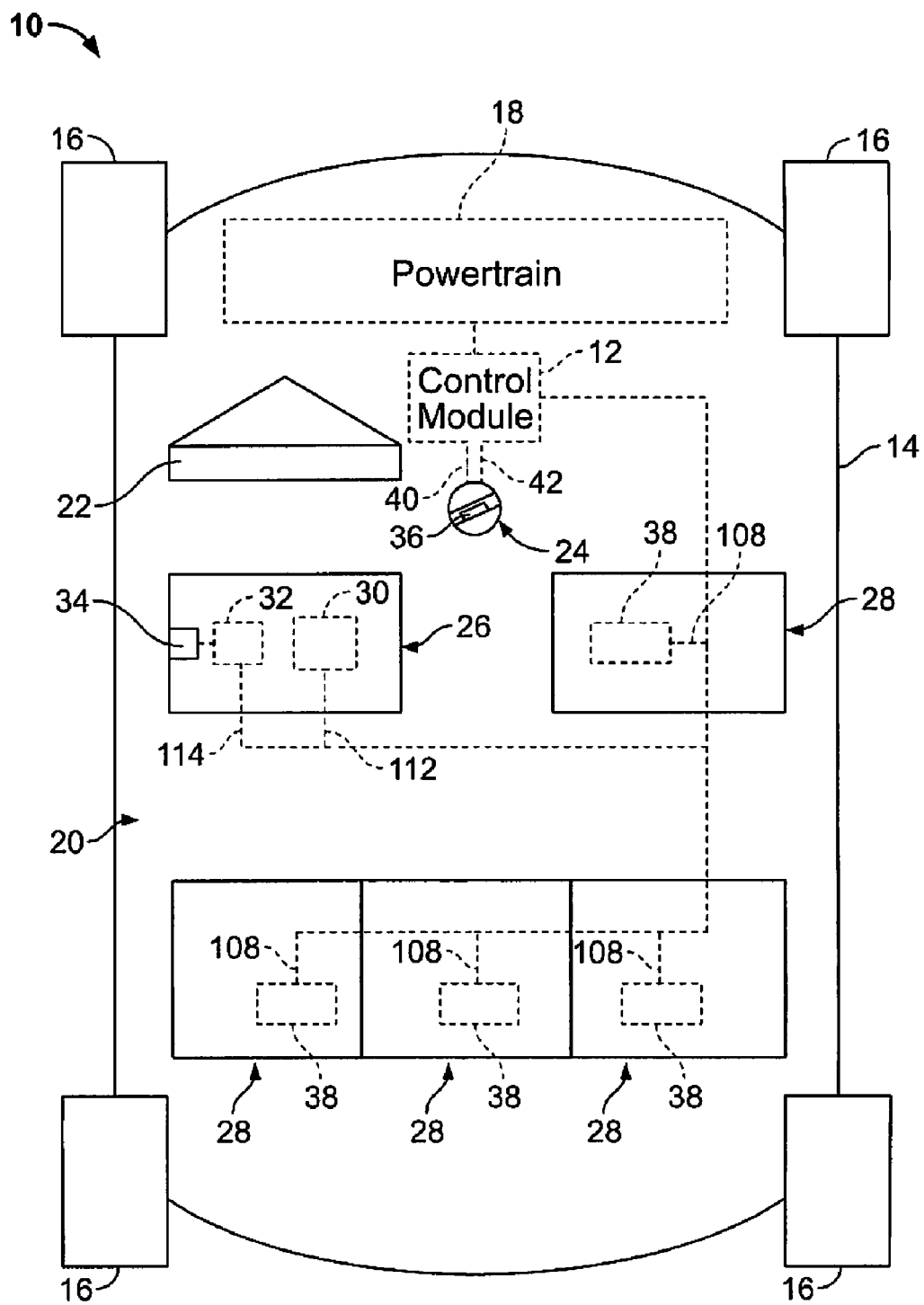
FIG. 1 is a schematic illustration of a motor vehicle incorporating a lockout system according to the principles of the present disclosure.

With reference to FIG. 1, an exemplary motor vehicle 10 including a lockout control module 12 is shown. As any exemplary motor vehicle 10 known in the art could be employed with the lockout control module 12, the motor vehicle 10 will not be discussed in great detail herein. Briefly, however, the motor vehicle 10 can include a frame 14, one or more wheels 16, and a powertrain 18. The wheels 16 can support the frame 14, and can be operably coupled to the frame 14. The powertrain 18 can be coupled to the frame 14, and can be operable to drive the wheels 16. In this regard, briefly, the powertrain 18 can include an engine, and can include various additional components, such as a torque converter and a transmission or transaxle, as is generally known in the art. The frame 14 can further define a passenger cabin, which can be generally indicated by reference numeral 20.

The passenger cabin 20 can include a steering device 22, an ignition switch 24, a driver seat 26 and one or more passenger seats 28. The steering device 22 can be coupled to a steering system, and can be used by the occupant of the driver seat 26 to steer the motor vehicle 10 as is generally known. The ignition switch 24 can receive an input signal 40 from a key 36, which can be operable to close the ignition switch 24 to start the operation of the powertrain 18, or open the ignition switch 24 to stop the operation of the powertrain 18, as is known in the art. The ignition switch 24 can also receive a key signal 42 from the key 36 or a transmitter coupled to the key 36, which can indicate a type of key 36 present in the motor vehicle 10. For example, the key signal 42 can indicate if the key 36 is a full access key, a supervisor access key or a restricted access key, as will be discussed herein. The ignition switch 24 can be in communication with the lockout control module 12 to transmit the input signal 40 and the key signal 42 to the lockout control module 12.

The driver seat 26 can be positioned adjacent to the steering device 22. The driver seat 26 can include a driver sensor 30, and optionally, a seat belt sensor 32. The driver sensor 30 can be in communication with the lockout control module 12, and can output a signal that indicates if the driver seat 26 is occupied, and thus, can comprise a weight sensor, infrared (IR) sensor, vision system, camera system, etc. that is capable of determining if an occupant is seated in the driver seat 26, as is generally known. The seat belt sensor 32, if employed, the seat belt sensor 32 can be in communication with the lockout control module 12, and can output a signal that indicates if a seat belt 34 associated with the driver seat 26 is fastened, as is generally known.

The passenger seat(s) 28 can be considered those seats other than the driver seat 26, and thus, can comprise any suitable area of the passenger cabin 20 that is operable to secure an occupant during the operation of the motor vehicle 10. It will be understood that although the motor vehicle 10 is illustrated as including four passenger seat(s) 28, the motor vehicle 10 could include any number of passenger seats, such as one, three, seven, eight, eleven, etc. The passenger seat(s) 28 can each include a passenger sensor 38. The passenger sensor 38 can be in communication with the lockout control module 12, and can output a signal that indicates if the passenger seat 28 associated with the passenger sensor 38 is occupied, and thus, can comprise a weight sensor, infrared (IR) sensor, vision system, camera system, etc. that is capable of determining if an occupant is seated in the passenger seat 28, as is generally known.

Figure 2:
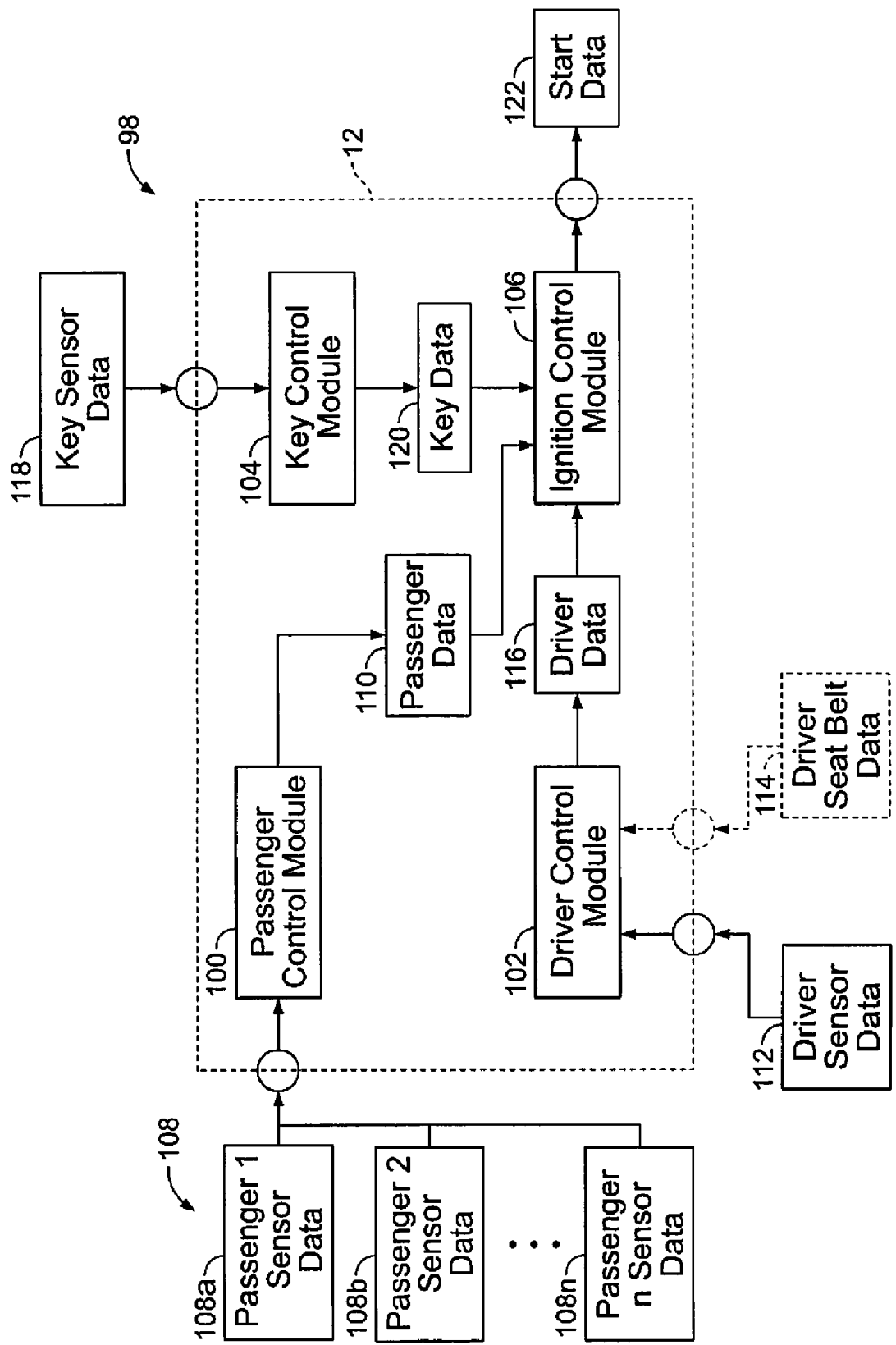
FIG. 2 is a dataflow diagram illustrating an exemplary lockout system for the motor vehicle of FIG. 1.

With reference now to FIG. 2, a dataflow diagram illustrates an exemplary lockout control system 98 that can be embedded within the lockout control module 12. Various embodiments of the lockout control system according to the present disclosure can include any number of sub-modules embedded within the lockout control module 12. The sub-modules shown may be combined and/or further partitioned to similarly determine whether to enable the activation of the powertrain 18 based on the signals generated by the driver sensor 30, seat belt sensor 32, key 36 and passenger sensor 38. In various embodiments, the lockout control module 12 can include a passenger control module 100, a driver control module 102, a key control module 104 and an ignition control module 106.

The passenger control module 100 can receive as input passenger sensor data 108. The passenger sensor data 108 can comprise signals received from the passenger sensors 36, and thus, can comprise passenger 1 sensor data 108a, passenger 2 sensor data 108b to passenger n sensor data 108n. Based on the passenger sensor data 108, the passenger control module 100 can determine if one or more of the passenger seat(s) 28 is occupied, and can set passenger data 110 for the ignition control module 106. The passenger data 110 can comprise data that indicates if at least one of the passenger seat(s) 28 is occupied.

The driver control module 102 can receive as input driver sensor data 112 and can optionally include driver seat belt data 114. The driver sensor data 112 can comprise a signal from the driver sensor 30, and thus, can provide data that can indicate whether the driver seat 26 is occupied. The driver seat belt data 114, if employed, can comprise a signal from the driver seat belt sensor 32, and thus, can comprise data that can indicate whether the seat belt 34 associated with the driver seat 26 is fastened. Upon receipt of the driver sensor data 112, and optionally, the driver seat belt data 114, the driver control module 102 can determine if the driver seat 26 is occupied, and optionally, if the occupant has fastened the seat belt 34. The driver control module 102 can set driver data 116 for the ignition control module 106, which can comprise data that indicates that whether the driver seat 26 is occupied, and optionally, if the seat belt 34 is fastened.

The key control module 104 can receive as input key sensor data 118. The key sensor data 118 can comprise signals received from the ignition switch 24, and can include the input signal 40 and the key signal 42. Based on the key sensor data 118, the key control module 104 can set key data 120 for the ignition control module 106. The key data 120 can comprise data that can indicate the type of key 36 in the ignition switch 24, and if a request to start the powertrain 18 has been received by the ignition switch 24.

For example, the key data 120 can comprise data that indicates that a limited access key is in the ignition switch 24, a supervisor access key is in the ignition switch 24, or that a full access key is in the ignition switch 24. In this regard, if a limited access key is in the ignition switch 24, then the operation of the motor vehicle 10 can be restricted based on whether passengers are present in the motor vehicle 10, as will be discussed herein. If a supervisor access key is present within the ignition switch 24, then the operation of the motor vehicle 10 can be restricted based on whether a supervisor is seated in one of the passenger seats 28, as will be discussed herein. If a full access key is in the ignition switch 24, then the operation of the motor vehicle 10 can proceed without regard to the number of passengers present in the motor vehicle 10, as will be discussed herein.

The ignition control module 106 can receive as input the passenger data 110, the driver data 116 and the key data 120. Based on the passenger data 110, the driver data 116 and the key data 120, the ignition control module 106 can output start data 122 for the powertrain 18. The start data 122 can comprise a signal to start the powertrain 18 to enable the operation of the motor vehicle 10.

Figure 3:
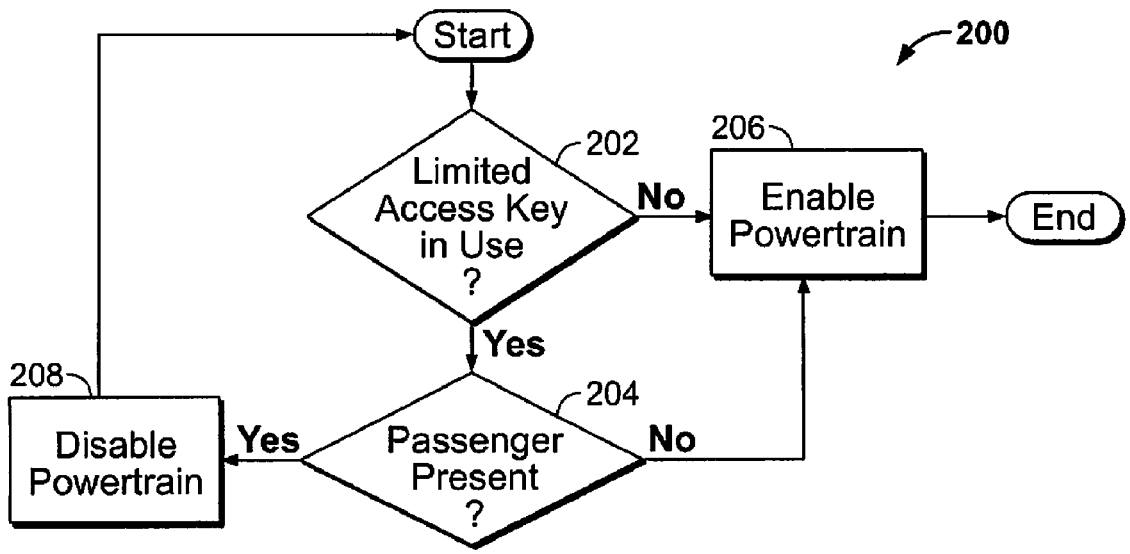
FIG. 3 is a process flow diagram illustrating an exemplary lockout method that can be performed by the lockout system of FIG. 2 in accordance with various aspects of the present teachings.

In this regard, with reference to FIG. 3, a process flow diagram illustrates an exemplary method 200 performed by the lockout control module 12 according to one of various embodiments. As can be appreciated in light of the disclosure, the order of operation within the method 200 is not limited to the sequential execution as illustrated in FIG. 3, but may be performed in one or more varying orders as applicable and in accordance with the present teachings. With reference to FIGS. 2-3, at decision block 202, the method can determine if a restricted or limited access key 36 is in use, based on the key data 120. If a limited access key 36 is in use, then the method can go to decision block 204.

Otherwise, the method can go to block 206. At block 206, the method can start or enable the powertrain 18 by outputting the start data 122 for the powertrain 18. Then the method can end.

At decision block 204, the method can determine if a passenger is present in the motor vehicle 10 based on the passenger data 110. If a passenger is present in the motor vehicle 10, then the method can go to block 208. At block 208, the method can disable the powertrain 18 to prevent the operation of the motor vehicle 10 with passengers present in the motor vehicle 10. Then, the method can loop to decision block 202. If a passenger is not present in the motor vehicle 10, then the method can go to block 206. Thus, the lockout control module 12 can be operable restrict the operation of the motor vehicle 10 when passengers are present in the motor vehicle 10, based on whether a restricted key 36 is in use.

Figure 4:
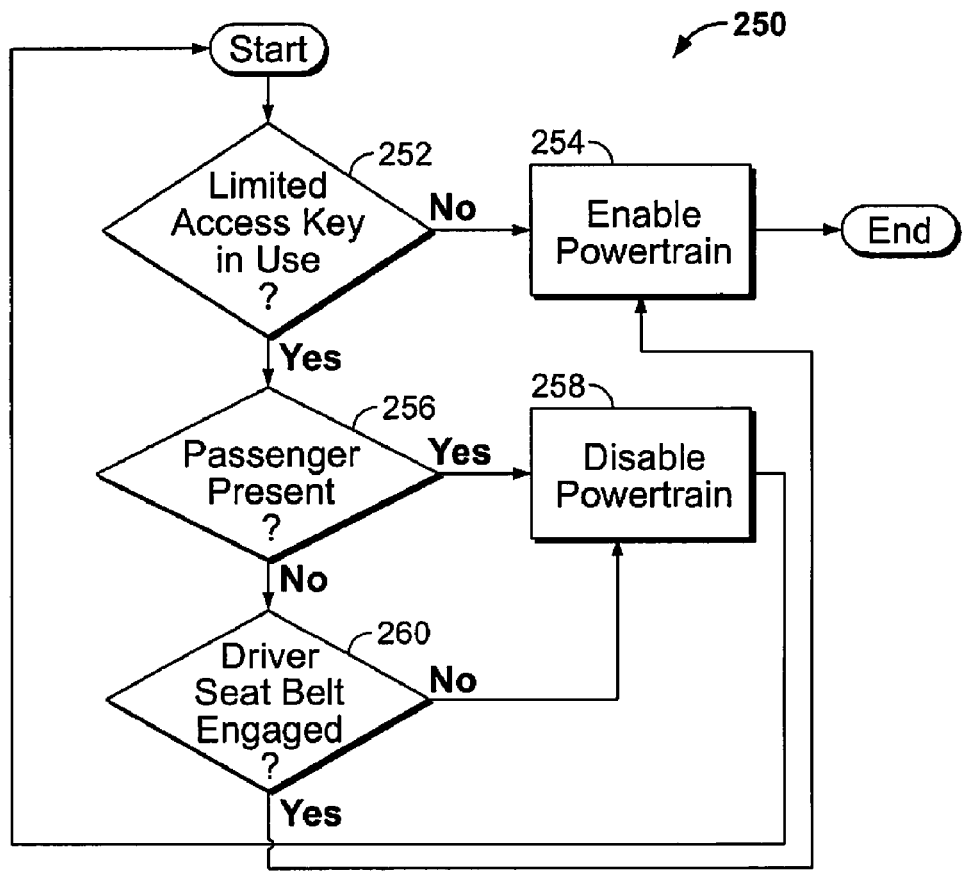
FIG. 4 is a process flow diagram illustrating an exemplary lockout method that can be performed by the lockout system of FIG. 2 in accordance with various aspects of the present teachings.

Now, with reference to FIG. 4, a process flow diagram illustrates an exemplary method 250 performed by the lockout control module 12 according to one of various embodiments. As can be appreciated in light of the disclosure, the order of operation within the method 250 is not limited to the sequential execution as illustrated in FIG. 4, but may be performed in one or more varying orders as applicable and in accordance with the present teachings. With reference to FIGS. 2 and 4, at decision block 252, the method can determine if a limited access or restricted access key 36 is in use, based on the key data 120. If a limited access key 36 is not in use, then the method can go to block 254. At block 254, the method can transmit the start data 122 to the powertrain 18 to start or enable the powertrain 18, which can enable the operation of the motor vehicle 10. Then, the method can end.

Otherwise, the method can go to decision block 256. At decision block 256, the method can determine if a passenger is present in the motor vehicle 10 based on the passenger data 110. If a passenger is present, then the method can go to block 258. At block 258, the method can disable the powertrain 18 to prevent the operation of the motor vehicle 10. Then, the method can loop to decision block 252.

Otherwise, if a passenger is not present in the motor vehicle 10, then the method can go to decision block 260. At decision block 260, the method can determine if the seat belt 34 associated with the driver seat 26 is fastened. If the driver seat belt 34 is fastened or engaged, then the method can go to block 254. Otherwise, the method can go to block 258.

Figure 5:
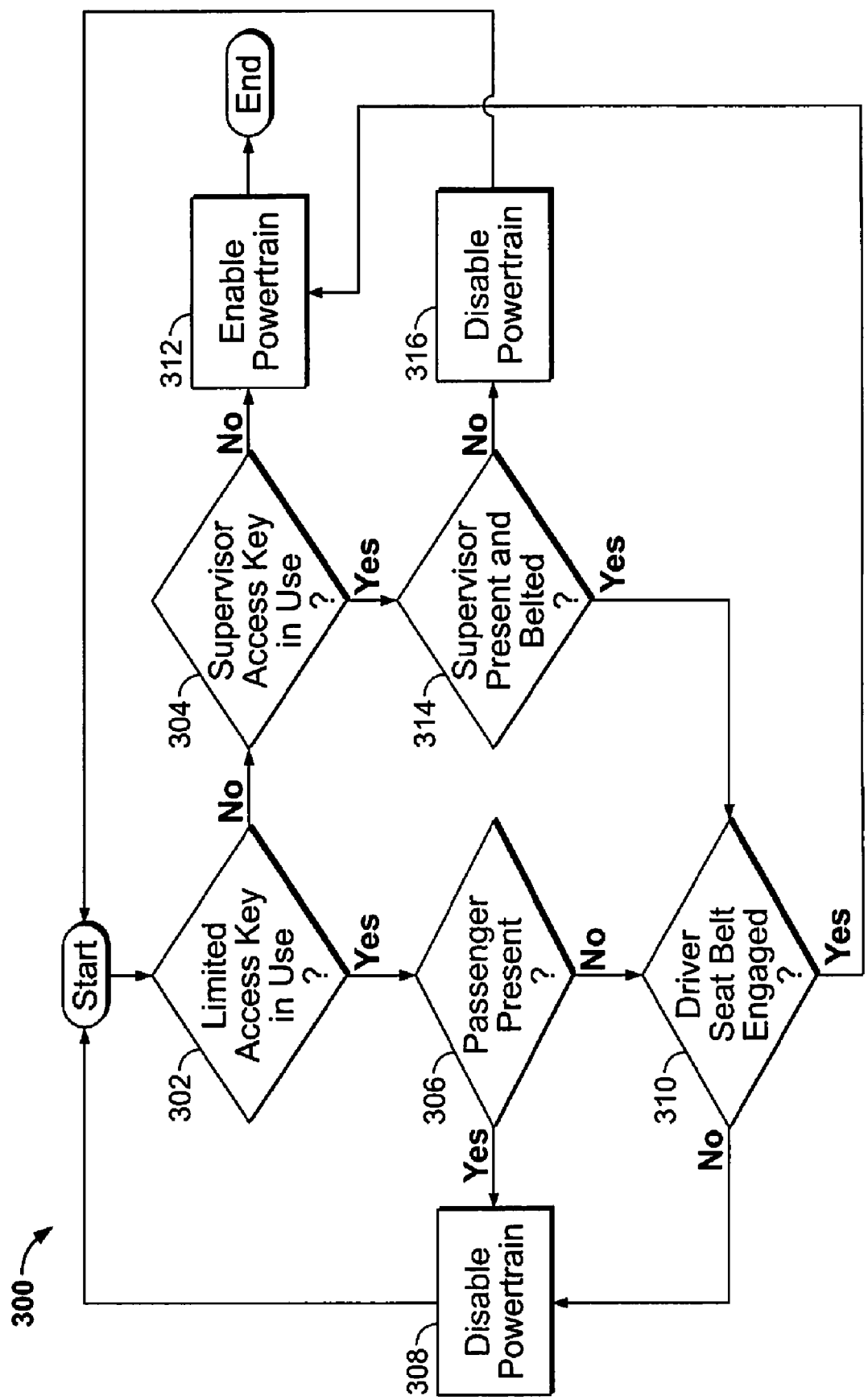
FIG. 5 is a process flow diagram illustrating an exemplary lockout method that can be performed by the lockout system of FIG. 2 in accordance with various aspects of the present teachings.

With reference to FIG. 5, a process flow diagram illustrates an exemplary method 300 performed by the lockout control module 12 according to one of various embodiments. As can be appreciated in light of the disclosure, the order of operation within the method 300 is not limited to the sequential execution as illustrated in FIG. 5, but may be performed in one or more varying orders as applicable and in accordance with the present teachings. With reference to FIGS. 2 and 5, at decision block 302, the method can determine if a limited access or restricted access key 36 is in use, based on the key data 120. If a limited access key 36 is not in use, then the method can go to decision block 304. Otherwise, the method can go to decision block 306.

At decision block 306, the method can determine if a passenger is present in the motor vehicle 10 based on the passenger data 110. If a passenger is present, then the method can go to block 308. At block 308, the method can disable the powertrain 18 to prevent the operation of the motor vehicle 10. Then, the method can loop to decision block 302.

Otherwise, if a passenger is not present in the motor vehicle 10, then the method can go to decision block 310. At decision block 310, the method can determine if the seat belt 34 associated with the driver seat 26 is fastened. If the seat belt 34 associated with the driver seat 26 is not fastened, then the method can go to block 308.

If the driver seat belt 34 is fastened or engaged, then the method can go to block 312. At block 312, the method can transmit the start data 122 to the powertrain 18 to start or enable the powertrain 18, which can enable the operation of the motor vehicle 10. Then, the method can end.

If at decision block 302, a limited access key is not in use, then at decision block 304 the method can determine if a supervisor access key is in use, based on the key data 120. If a supervisor access key 36 is not in use, then the method can go to block 312. Otherwise, the method can go to decision block 314.

At decision block 314, the method can determine if a supervisor is present and belted in the motor vehicle 10 based on the passenger data 110. If a passenger is present and belted, then the method can go to decision block 310. Otherwise, if a supervisor is not both present and belted in the motor vehicle 10, then the method can go to block 316. At block 316, the method can disable the powertrain 18 to prevent the operation of the motor vehicle 10. Then, the method can loop to decision block 302.

Thus, the lockout control module 12 can prevent the operation of the motor vehicle 10 by inhibiting the powertrain 18 in instances in which a driver with restricted or limited access is attempting to operate the motor vehicle 10 with at least one passenger, and optionally, without engaging or fastening the seat belt 34 prior to attempting to turn the ignition switch 24 from opened ("Off") to closed ("Start" or "On"). By preventing the operation of the motor vehicle 10 when distractions are present, incidents caused by the distraction of young or inexperienced drivers may be reduced. In addition, the use of key types can provide owners of the motor vehicle 10 with control over the use of their motor vehicle 10 by others.

While specific examples have been described in the specification and illustrated in the drawings, it will be understood by those of ordinary skill in the art that various changes can be made and equivalents can be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example can be incorporated into another example as appropriate, unless described otherwise, above. Moreover, many modifications can be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

For example, while the lockout control module 12 has been described as including an ignition switch 24 that can receive a signal from a key 36 that is inserted into an ignition switch 24, those of skill in the art will appreciate that the present disclosure, in its broadest aspects, may be constructed somewhat differently. In this regard, the lockout control module 12 could be controlled by a "key" in the form of a transmitter coupled to or embedded in a badge, wristband, license, or other device.

What is claimed is:

1. A lockout system for a motor vehicle, comprising:
a source of input that identifies a status of a driver of the motor vehicle;
a source of passenger input that indicates if at least one passenger is present in the motor vehicle; and
a lockout control module operable to disable the operation of the motor vehicle if at least one passenger is present in the motor vehicle, based on the status of the driver.

2. The system of claim 1, wherein the source of input is a key that is operable to transmit the status of the driver.

3. The system of claim 2, wherein the motor vehicle includes an ignition switch in communication with the lockout control module, the ignition switch operable to receive the key and generate a signal that indicates the status of the driver to the lockout control module.

4. The system of claim 3, wherein the source of passenger input further comprises:
at least one passenger sensor in communication with the lockout control module and responsive to an input received from at least one passenger seat in the motor vehicle to generate a signal that indicates if at least one passenger is present in the motor vehicle.

5. The system of claim 4, further comprising:
a driver sensor in communication with the lockout control module and responsive to an input received from a driver seat in the motor vehicle to generate a signal that indicates if a driver is present in the motor vehicle.

6. The system of claim 5, wherein the lockout control module further comprises:
a passenger control module that determines if a passenger is present in the motor vehicle based on the signal from the at least one passenger sensor;
a driver control module that determines if a driver is present in the motor vehicle based on the signal from the driver sensor;
a key control module that determines the status of the driver based on the signal from the ignition switch; and
wherein the status of the driver is limited access, supervisor access or full access.

7. The system of claim 6, wherein the motor vehicle includes a powertrain in communication with and responsive to the lockout control module, and the lockout control module further comprises:
an ignition control module that outputs start data to start the powertrain based on whether at least one passenger is present in the motor vehicle, whether a driver is in the motor vehicle, and the status of the driver.

8. The system of claim 7, further comprising:
a driver seat belt sensor in communication with the driver control module and responsive to an input received from a driver seat belt in the motor vehicle to generate a signal that indicates if the driver seat belt is engaged; and
wherein the driver control module determines if the driver seat belt is engaged based on the signal, and the ignition control module outputs start data to start the powertrain based on whether at least one passenger is present in the motor vehicle, whether a driver is in the motor vehicle, whether the driver seat belt is fastened, and the status of the driver.

9. The system of claim 8, wherein if the status of the driver is limited access, and at least one passenger is present in the motor vehicle, then the ignition control module does not start the powertrain.

10. The system of claim 9, wherein the status of the driver is limited access based on an age of the driver.

11. The system of claim 9, wherein if the status of the driver is supervisor access, and at least one passenger is present in the motor vehicle, then the ignition control module starts the powertrain.

12. The system of claim 9, wherein if the status of the driver is full access, then the ignition control module starts the powertrain.

13. A lockout system in combination with a motor vehicle having a frame that defines a passenger cabin that includes a driver seat and at least one passenger seat, with at least one wheel coupled to the frame, and a powertrain operable to drive the at least one wheel to propel the motor vehicle, the lockout system comprising:
a key that is operable to indicate a status of a driver;
an ignition switch disposed in the passenger cabin and operable to receive the key and generate a signal that indicates the status of the driver and a request to enable the powertrain;
at least one passenger sensor responsive to an input received from the at least one passenger seat to generate a signal that indicates if at least one passenger is present in the motor vehicle; and
a lockout control module in communication with the ignition switch, the at least one passenger sensor, and the powertrain of the motor vehicle, the lockout control module operable to disable the powertrain if at least one passenger is present in the passenger cabin, based on the status of the driver.

14. The system of claim 13, further comprising:
a driver sensor responsive to an input received from a driver seat in the motor vehicle to generate a signal that indicates if a driver is present in the motor vehicle;
a passenger control module that determines if the passenger is present in the motor vehicle based on the signal from the at least one passenger sensor;
a driver control module that determines if the driver is present in the motor vehicle based on the signal from the driver sensor;
a key control module that determines the status of the driver based on the signal from the ignition switch; and
an ignition control module that outputs start data to enable the powertrain based on whether the at least one passenger is present in the motor vehicle, whether the driver is in the motor vehicle, and the status of the driver.

15. The system of claim 14, wherein if the status of the driver is restricted, and at least one passenger is present in the motor vehicle, then the ignition control module does not enable the powertrain.

16. The system of claim 15, wherein the status of the driver is restricted based on an age of the driver.

17. A method for selectively enabling a powertrain of a motor vehicle comprising:
determining a status of a driver in the motor vehicle;
determining if at least one passenger is present in the motor vehicle; and
preventing the operation of the motor vehicle if the status of the driver is restricted and at least one passenger is present in the motor vehicle.

18. The method of claim 17, wherein determining a status of a driver further comprises:
determining if a key input into an ignition switch by the driver is a restricted access key.

19. The method of claim 17, further comprising:
enabling the operation of the motor vehicle if the status of the driver is full access; and
enabling the operation of the motor vehicle if the status of the driver is supervisor access and at least one passenger is present in the motor vehicle.

20. The method of claim 17, further comprising:
determining if a seat belt associated with the driver is engaged; and
preventing the operation of the motor vehicle if the status of the driver is restricted and the seat belt is disengaged.

* * * * *